March 3, 1959     J. M. LEAKE     2,875,740

STAMPED VALVE ROTATOR CAGE

Filed Aug. 29, 1955

INVENTOR.

James M. Leake

United States Patent Office 2,875,740
Patented Mar. 3, 1959

2,875,740

STAMPED VALVE ROTATOR CAGE

James M. Leake, Monroe, Mich.

Application August 29, 1955, Serial No. 531,177

6 Claims. (Cl. 123—90)

This invention relates to a stamped valve rotator cage of the type used in the overhead type valve internal combustion engine.

Many arrangements have been used to provide silent operation of the valve operating mechanism and to provide rotation of the valves of the over-head type of internal combustion engine. Hydraulic means, springs and other arrangements have been utilized for this purpose but they have proven to be either too expensive, ineffective or not durable.

My novel stamped rotator cage is pressed from sheet metal, thereby eliminating expensive machining processes. Furthermore the warped surfaces are readily formed and held to exact dimensions because the part is formed in dies by means of a press.

One of the objects of my invention is to provide a stamped valve rotator cage that is effective, durable, simple and inexpensive. Other objects of my novel invention will appear in the following description.

Figure 1:
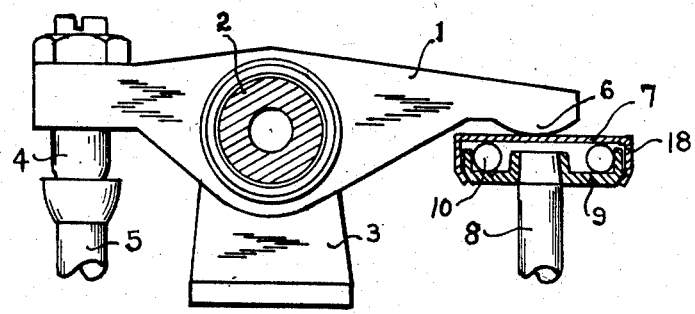
Fig. 1 shows a valve operating mechanism embodying my novel stamped valve rotator cage.
Figure 2:
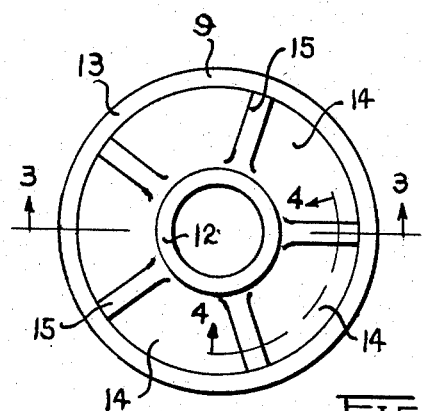
Fig. 2 is a top plan view of my novel stamped valve rotator cage.
Figure 4:
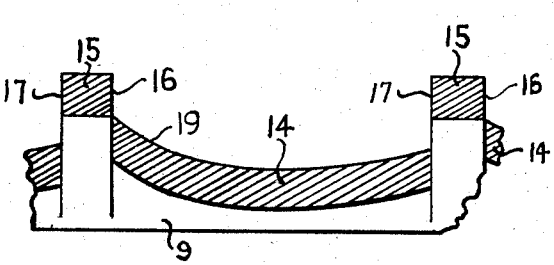
Fig. 4 is an enlarged sectional view taken along line 4—4 of Fig. 2.
Figure 3:
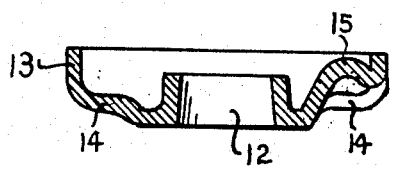
Fig. 3 is a sectional view taken along line 3—3 of Fig. 2.

Referring in more detail to the drawings a conventional rocker arm 1 is mounted on a rocker shaft 2, which is supported by a rocker shaft bracket 3. An adjustable contacting bearing 4 engages a push rod 5. A fixed contacting bearing 6 engages the valve rotator assembly 7 which is located on the upper end of the valve stem 8.

Figure 5:
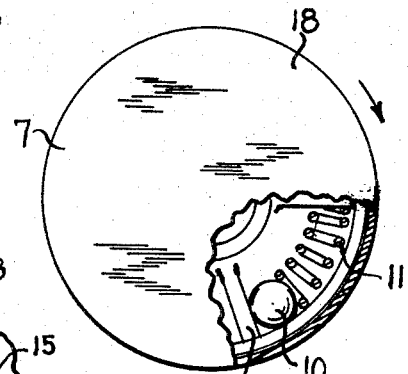
Fig. 5 is a partially sectioned view of a valve rotator assembly embodying my novel stamped valve rotator cage.
Figure 6:
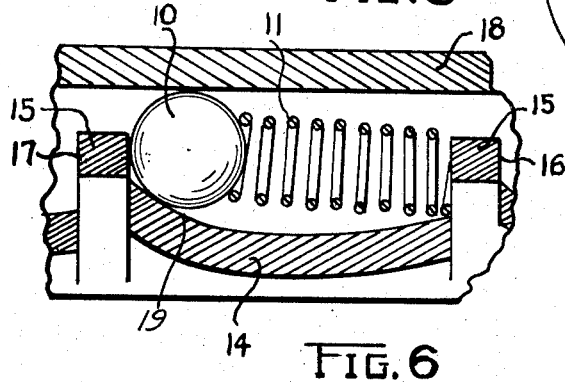
Fig. 6 is an enlarged partial sectional view of the valve rotator assembly shown in Fig. 5 showing the arrangement of the valve rotator cage, the springs, the balls and the cover.

The valve rotator cage assembly 7 consists of a stamped valve rotator cage 9, a cover member 18 and a plurality of hardened steel balls 10 and springs 11 arranged as shown in Figs. 5 and 6.

The stamped rotator cage 9 comprises a frustum portion 12 the inner surface of which is adapted to engage a valve stem as shown in Fig. 1. The upstanding annular flange 13 forms the outer periphery of the stamped rotor cage 9. A plurality of concave or warped portions 14 connect the frustum portion 12 and the annular flange 13. A plurality of stop members 15 are circumferentially spaced between the warped portions 14 and extend above the warped portions 14. My novel stamped valved rotator cage is made of sheet metal and formed in dies by means of a stamping press. Sufficient pressure is applied to the sheet metal in the forming process to cause the metal to flow and thereby provide a valve rotator cage of precise dimensions.

My novel stamped rotator cage is utilized in a valve rotator assembly as shown in Figs. 5 and 6. The compression springs 11 bear against the sides 17 of the rib or stop members 15 forcing the steel balls 10 to the left. The sides 16 of the stop members 15 provide a stop for the steel balls 10. A cover member 18 telescopes over the annular flange 13 and is bent inwardly at its lower edge to limit the upward travel of the cover member 18. The cover member 18 is sufficiently larger in diameter than the stamped valve rotator cage 9 to permit the cover member 18 to rotate about the cage 9. When the valve rotator unit 7 is assembled the springs 11 force the steel balls 10 up the incline 19 of the concave portions 14, thereby, lifting the cover member 18 to its upper position.

When the valve rotator unit 7 is assembled in an engine as shown in Fig. 1 the cover member 18 is forced up against the contacting bearing 6. When the cam shaft (not shown) of the engine pushes the push rod 5 upward the contacting bearing 6 moves down. A pressure is applied to the upper surface of the cover member 18 the balls 10 tend to move down the incline 19, thereby, tending to turn the stamped valve rotator cage 9 in the direction indicated by the arrow in Fig. 5. Since the frustum hub 12 engages the valve stem 8 the valve is caused to rotate as the valve rotator cage 9 rotates.

The springs 11 tend to force the steel balls 10 up the incline 19 at all times. The steel balls 10 in turn force the cover member 18 upward against the fixed contacting bearing 6. Since the cover member 18 engages the contacting bearing 6 continuously quiet operation is obtained and the knocking noise commonly known as noisy tappets is eliminated.

In order to obtain the desired result the proper curvature of the upper surface of the concave or warped portion 14 is very important. With my novel stamped rotator cage the curvature of the concave portions can be held to uniform and precise dimensions in quantity production without expensive machining processes.

It is believed that the above description will enable those skilled in the art to understand the operation and novel features of my improved device.

Having thus described my invention what I claim is:

1. A valve rotator cage of the type described provided with a hub adapted to engage a valve stem, an annular upstanding peripherial edge, a plurality of warped web portions joining said hub and said peripherial edge and a plurality of rib members extending above said warped web portions and spaced circumferentially therebetween and extending from said hub to said upstanding peripherial edge.

2. A valve rotator cage comprising a hub adapted to engage a valve stem, an upstanding flange providing the outer periphery, a plurality of circumferentially downwardly concave web portions joining said hub and said upstanding flange and a plurality of stop portions circumferentially spaced between said web portions and joining said hub and said upstanding flange.

3. A stamped valve rotator cage of the type described provided with a frustoconical hub portion, an annular upstanding flange, a plurality of warped portions intermediate said hub and said annular upstanding flange and a plurality of stop members extending above said warped portions and spaced circumferentially therebetween said stop members extending substantially from said hub to said annular upstanding flange.

4. A stamped valve rotator cage of the type described comprising a frusto-conical hub portion, an annular upstanding flange, a plurality of circumferentially concave web portions intermediate said hub portion and said annular flange, and a plurality of rib members provided with vertical side walls, said rib members extending above and located intermediate said web portions, said rib members extending radially between said hub portion and said annular upstanding flange.

5. A stamped valve rotator cage of the type described comprising a hub portion adapted to engage a valve stem, an annular upstanding flange adapted to engage a cover member, a plurality of spaced warped portions intermediate said hub and said annular flange, said warped portions provided with a predetermined contour, and a plurality of rib members circumferentially spaced between said warped portions and extending substantially higher than said warped portions between said hub portion and said annular flange, one of the faces of said rib members adapted to provide a spring bearing surface and the other side of said rib members adapted to provide a ball stop.

6. A stamped valve rotator cage of the type described comprising a central hub portion provided by an annular bent up portion, an annular upstanding flange located radially outwardly from said hub, a plurality of downwardly concave warped portions intermediate said hub and said annular upstanding flange and a plurality of rib members separated from and located substantially above said warped portions, said rib members provided with vertical side walls and extending substantially from said hub portion to said upstanding flange.

References Cited in the file of this patent

UNITED STATES PATENTS

| | | |
|---|---|---|
| 2,397,502 | Ralston | Apr. 2, 1946 |
| 2,582,060 | Newton | Jan. 8, 1952 |
| 2,624,323 | Thorne | Jan. 6, 1953 |
| 2,648,319 | Ralston | Aug. 11, 1953 |
| 2,662,511 | Sward | Dec. 15, 1953 |
| 2,686,508 | Ralston | Aug. 17, 1954 |

FOREIGN PATENTS

| | | |
|---|---|---|
| 82,062 | Austria | Dec. 27, 1920 |